United States Patent
Tuohino et al.

[11] Patent Number: 6,115,600
[45] Date of Patent: Sep. 5, 2000

[54] METHOD FOR IMPROVING CHARGING CRITERIA IN A MOBILE TELEPHONE NETWORK

[75] Inventors: Markku Tuohino, Espoo; Risto Janhonen, Kirkkonummi; Veli Turkulainen, Helsinki, all of Finland

[73] Assignee: Nokia Telecommunications Oy., Espoo, Finland

[21] Appl. No.: 08/875,462

[22] PCT Filed: Dec. 21, 1995

[86] PCT No.: PCT/FI95/00706

§ 371 Date: Jun. 20, 1997

§ 102(e) Date: Jun. 20, 1997

[87] PCT Pub. No.: WO96/20571

PCT Pub. Date: Jul. 4, 1996

[30] Foreign Application Priority Data

Dec. 23, 1994 [FI] Finland ..................................... 946092

[51] Int. Cl.[7] ...................................................... H04Q 7/22
[52] U.S. Cl. ............................ 455/405; 455/461; 379/112
[58] Field of Search .................................... 455/405, 406, 455/408; 379/114, 112; 451/461

[56] References Cited

U.S. PATENT DOCUMENTS

| | | |
|---|---|---|
| 5,243,598 | 9/1993 | Lee .......................................... 370/95.3 |
| 5,276,907 | 1/1994 | Median . |
| 5,295,180 | 3/1994 | Vendetti et al. .......................... 455/405 |
| 5,301,223 | 4/1994 | Amadon et al. . |
| 5,537,610 | 7/1996 | Mauger et al. . |
| 5,579,379 | 11/1996 | D'Amico et al. ........................ 379/112 |
| 5,920,820 | 7/1999 | Qureshi et al. .......................... 455/461 |

FOREIGN PATENT DOCUMENTS

| | | |
|---|---|---|
| 2272607 | 5/1993 | United Kingdom . |
| 93/18606 | 9/1993 | WIPO . |
| WO 93/18606 | 9/1993 | WIPO . |

OTHER PUBLICATIONS

Tellabs, Incorporated, "Switch Sharing in Cellular Networ0ks with TITAN 5300 Digital Cross Connect Systems", Mar. 1990.

Primary Examiner—William Cumming
Attorney, Agent, or Firm—Pillsbury Madison & Sutro LLP

[57] ABSTRACT

Charging criteria in a mobile telephone network may be improved by choosing one cell or a group of several cells of the mobile telephone network as a group of special cells. The cells of the group may be located in the areas of different MSC's. When a call is being established, a service control point SCP located in an intelligent network analyses whether the location cell of a calling subscriber and that of a called subscriber belong to the group of special cells. Subscriber numbers of the subscribers may also be taken into account. The service control point SCP then applies a special charging criterion determined for the group. In a case where the location cell of the calling subscriber and that of the called subscriber are located in separate MSC areas (MSC1/SSP1, MSC2/SSP2), the information on the location cell of the called subscriber is transmitted to the service control point (SCP1) connected to the mobile switching center (MSC1/SSP1) of the calling subscriber either directly or in a message in accordance with signalling used between MSC's.

15 Claims, 3 Drawing Sheets

METHOD FOR IMPROVING CHARGING CRITERIA IN A MOBILE TELEPHONE NETWORK

This application is the national phase of international application PCT/FI95/00706 filed Dec. 21, 1995 which designated the U.S.

BACKGROUND OF THE INVENTION

This invention relates to charging criteria used in a mobile telephone network for determining a price for a call between two subscribers.

In a fixed telephone network, a calling subscriber is aware of the charging criteria for the call already upon dialing the number of another, B subscriber as charging depends on whether it is a question of a local call, a long-distance call or an international call. In PBX exchanges (Private Branch Exchange) connected to a fixed telephone network, or in PABX networks, internal calls are free of charge. In cordless PBX's, part of the subscriber lines are replaced with a radio connection. In cordless PBX's, there are both fixed and cordless extensions. Cordless PBX's thus allow the users of cordless telephones mobility, which depends on the coverage area of cordless base stations. A coverage area typically covers the indoor premises of an office building.

In mobile telephone networks, which enable a high degree of mobility, the charging criteria used in a fixed network cannot be used as such owing to the structure and the mode of operation of the network. In the following, the structure and the operation of a mobile telephone network will be illustrated by means of a prior art GSM mobile telephone network shown in FIG. 1. Communication between a mobile station MS located within a cell, and the network takes place over the radio path via a base transceiver station (BTS). Base transceiver stations are connected to a base station controller (BSC), whose tasks include e.g. management of radio channels, as well as changeover procedures. One base station controller BSC thus controls a number of base stations BTS. The location of a mobile station is known with the accuracy of a so-called location area (LA) composed of a few cells. A mobile station may move within the location area without a need to update the location information related to it. A plurality of base station controllers are connected to one mobile services switching centre MSC, which performs the main switching functions of the mobile telephone network. The area of the cells controlled by the mobile services switching centre is termed as an MSC area, and all the calls originating or terminating within this area are switched via this MSC. Furthermore, the MSC connects the mobile telephone network to external networks.

The mobile telephone network also contains data bases of different kinds. In a Home Location Register (HLR), subscriber data is permanently stored regardless of the current location of the subscriber. The HLR contains the MSISDN number of the subscriber, the International Mobile Subscriber Identity code IMSI to be used inside the network, subscriber service data, and routing information on a Visitor Location Register VLR. The Visitor Location Register VLR is integrated to all present MSC's, and it is used for recording the subscriber data obtained from the HLR for the duration of the visit of the subscriber to the area of the VLR. The VLR contains the subscriber's IMSI, MSISDN, subscriber service data, and the location area identifier LAI that has been used by the subscriber for updating the location information. The location of the subscriber is thus known with the accuracy of a location area.

In the following, call establishment in a mobile telephone network will be disclosed for understanding the charging criteria: When a subscriber switches on his mobile station MS, e.g. in cell A (FIG. 1), it signals an updating request to a base station, which request is directed to a mobile services switching centre MSC1, and further to a visitor location register VLR. The request searches an IMSI from a home location register HLR. Thereafter, once it has been made sure in the signalling between the VLR and the mobile station that the IMSI is correct, the VLR sends an update request to the HLR, which will send the subscriber data to the VLR. Now the location of the subscriber is updated, i.e. the HLR knows the address of the VLR, and the VLR knows in which location area LAI the subscriber is located.

When a subscriber A calls a subscriber B located in a location area 22 of a second mobile services switching centre MSC2, he dials the MSISDN number of subscriber B into his mobile station. Signalling phases taking place after this are indicated with ringed numbers in FIG. 1, followed by the number to be switched in the phase in question. Indication MAP, TUP/ISUP represents the protocol to be used in the signalling in question. Next, mobile station MS-A sends base station 5 a message containing the dialed number, phase 1. When MSC1 receives the message, it analyses it and checks whether the request may be accepted. As a part of the check, the subscriber data of subscriber A is searched from the VLR of the MSC1, said data being recorded in connection of the above-mentioned location updating. If the request is accepted, MSC1 will send an interrogation message to the HLR, said message containing the MSISDN number of the mobile station of subscriber B, phase 2. On the basis of this number, the HLR searches the data on subscriber B, the data containing the address of the current VLR of subscriber B. Next the HLR asks the VLR to provide a roaming number by sending information IMSI to it, phase 3, "whereafter the VLR sends the roaming number MSRN to the HLR, phase 4. The roaming number MSRN is sent from the HLR to MSC1, phase 5. Thereafter, it is possible to route the call from MSC1 to MSC2 on the basis of the roaming number MSRN received from the VLR, phase 6. The mobile services switching centre MSC2 of subscriber B asks the VLR incorporated into it for the subscriber data on subscriber B. The subscriber data indicates the location area LAI of subscriber B, so that MSC2 is able to send a paging message via the base station controller 2 in question (phase 7) to cells f, g, and h in the location area. Once the mobile station MS-B of subscriber B has answered the paging, a call will be established to subscriber B. It must be noted that only after the mobile station of subscriber B has answered the paging message, mobile services switching centre MSC2 knows the location of subscriber 2 to the accuracy of one cell.

A Service Switching Point (SSP) of an Intelligent Network (IN) may also be connected to a mobile services switching centre. The physical architecture of an intelligent network is shown in FIG. 2. The service switching point SSP provides the user access to the network, and handles all the necessary switching functions. It is capable of detecting the service requests of the intelligent network. Functionally, the SSP comprises the call management and service switching functions. A Service Control Point (SCP) comprises service programs, which are used for producing services of the intelligent network. A Service Data Point (SDP) is a database comprising data of the subscriber and the network, which data is used by the service programs of the network for providing individual services. The SCP may use the services of the SDP directly or via a signalling network. An Intelligent Peripheral (IP) provides special functions, such as announcements, as well and audio and multi dialling detection. The Service Switching and Control Point (SSCP) consists of an SCP and an SSP in one node. The tasks of an Service Management Point (SMP) include database management, controlling and testing of the network, and collecting network information. It may be connected to all other physical entities. A Service Creation Environment Point (SCEP) is used for determining, developing and testing the intelligent network, as well as for feeding services to the SMP. An Adjunct (AD) of a service functionally corresponds to the Service Control Point SCP, but it is directly connected to the SSP. A Service Node SN may control the services of the intelligent network and carry out data transmission with the users. It communicates directly with one or more SSP's. A Service Management Access Point (SMAP) is a physical entity providing the users a connection to the SMP.

A Basic Call State Model (BCSM) determined in connection with the Intelligent Network describes different phases of call processing and contains points where call processing may be interrupted for starting a service of the Intelligent Network. It identifies the detection points in a call and connection process, in which the IN service logic entities may interact with basic call and connection management functions.

On account of an intelligent network it is possible to provide to the user of a fixed network and a mobile telephone network a large number of various services, such as a Private Numbering Plan (PNP), which enables the use of private numbers, and a Closed User Group, in which the users may call only the subscribers belonging to the same group. Furthermore, Private Branch Exchanges (PBX) may be connected to a mobile telephone network. A separate numbering block is determined for PBX subscribers in the numbering space of an MSC.

In a mobile telephone network in accordance with the prior art, all cells are equal as far as the price of a call is concerned. In mobile telephone networks, the price of a call is based on whether it is a question of a call between a mobile station and a fixed network, or a mobile-to-mobile call. Due to the mobility of mobile stations, the basic rule of charging is to charge a subscriber A for the connection between him and the home network of a subscriber B, and to charge subscriber B for the connection between his present location and his home network. This is considered fair, as, in accordance with call setup described above, neither the calling subscriber nor the first mobile services switching centre knows the location of subscriber B, i.e. in which cell the subscriber is located when the call setup is being started.

To increase the flexibility of the charging criteria, it is possible to set a special charging parameter, which will make it possible to apply a lower tariff to the calls made from the number related to the parameters during off-peak times, and correspondingly, a higher tariff than normally during the peak times. This parameter will make the charging criterion time-dependent, but, in other respects, the charging will follow the above-mentioned principles.

When the charging criterion of mobile telephone networks described above are compared with those of the fixed network, a few problems arise. Since all the cells are equal from the point of view of the mobile telephone network, no other charging criteria may be offered to different groups of users except for flexibility based on the time of the day. The distance between the calling and the called subscriber, or the location of the called subscriber cannot be taken into account in real time when determining the charging criteria. Special charging criteria are not available for certain intra-cell calls or for certain inter-cell calls.

SUMMARY OF THE INVENTION

An object of this invention is to provide a method for improving the charging criteria, and to solve the above-mentioned problems.

In a method of the invention, one cell or a group of several cells is chosen as a group of special cells. The service control point SCP of the intelligent network has the information on the group and its cells. In the SCP, there is a service program for charging criteria for analysing whether the location cell of a calling subscriber and that of a called subscriber belong to the group of special cells. If that is the case, the charging criteria determined for the group will be applied to the call.

In accordance with a preferred embodiment, a subscriber group consisting of subscriber numbers may be determined. The Service Control Point SCP of the intelligent network has the information on the subscriber group and its subscriber numbers. When the service program for charging criteria is determining the charging criterion, it uses both the number and the location cell of the calling subscriber and those of the called subscriber as parameters. For instance, if at least one parameter refers to the group of special cells and to the group consisting of the subscriber group, the special charging criterion determined for the case may be applied.

In accordance with a preferred embodiment, when the location cell of the calling subscriber and that of the called subscriber are situated within separate MSC areas, the information on the location cell of the called subscriber is transmitted either every time, only on request from the MSC of the called subscriber to the service control point SCP connected to the MS of the calling subscriber.

In accordance with a preferred embodiment, where the location cell of the calling subscriber and that of the called subscriber are situated in separate MSC areas, the information on the location cell of the called subscriber is transmitted either every time or only on request first to the MSC of the calling subscriber, and further to the service control point SCE connected thereto.

In accordance with a preferred embodiment, when the location cell of the calling subscriber and that of the called subscriber are situated in separate MSC areas, the information on the location cell of the called subscriber is transmitted either every time, or only on request from the service control point SCP connected to the MSC of the called subscriber to the service control point SCP connected to the MSC of the calling subscriber.

BRIEF DESCRIPTION OF THE DRAWINGS

In the following, the invention will be disclosed in more detail with reference to the attached drawings in which.

DETAILED DESCRIPTION

Figure 1:
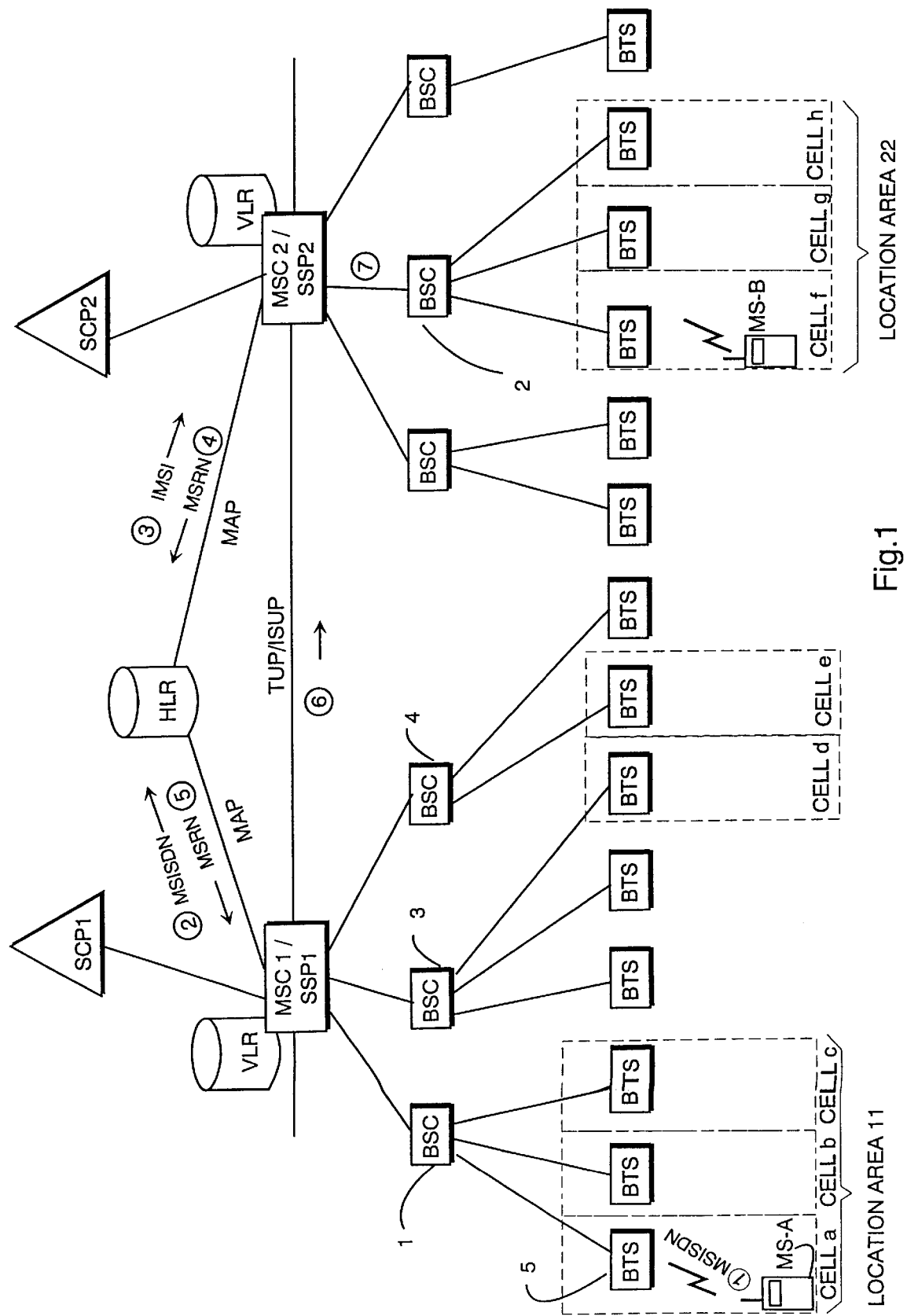
FIG. 1 shows the design of a prior art mobile telephone network.
Figure 2:
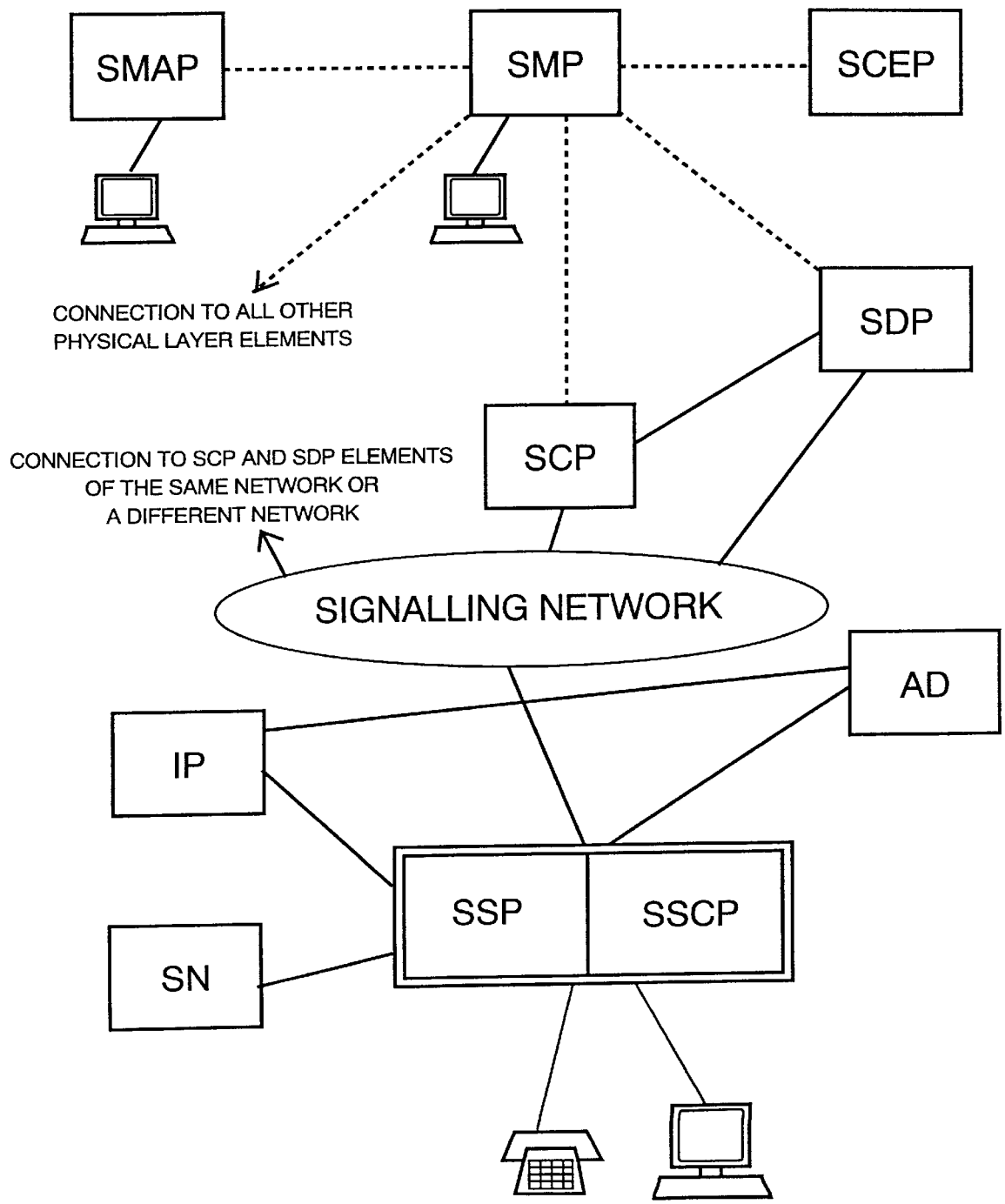
FIG. 2 shows the architecture of an intelligent network.

Reference is still made to FIG. 1. In accordance with the invention, cells a, c, d and e are chosen as the group of special cells. Separate charging criteria may be determined for intracell and intercell calls within this group.

Cells a and c are controlled by the same base station controller, and they thus belong to the same location area, whereas cells d and e are controlled by separate base station controllers (base station controllers 3 and 4), and they thus belong to separate location areas. The base station controllers of the base stations of the cells, however, are connected to the same mobile services switching centre MSC1/SSP1, and the service control point SCP1 connected thereto contains the information on which cells form the group of special cells. Suppose subscriber A is located in cell a and subscriber B is located in cell d. In accordance with call setup set out above, mobile services switching centre MSC1/SSP1 receives the information on the number and location cell of subscriber A once the mobile station of the subscriber has sent a call setup message. SCP1 analyses whether the location cell a of subscriber A belongs to the group of special cells and detects that is the case. Mobile services switching centre MSC1/SSP1 receives the information on the location cell of subscriber B once subscriber B has replied to the paging message sent to its location area. Service control point SCP1 analyses whether the location cell d of subscriber B belongs to the group of special cells. If SCP1 detects that the location cells of either or both of the subscribers belong to the group of special cells, service control point SCP1 chooses the charging criterion determined for the group of special cells as the charging criterion to be applied.

When it is desirable to limit the subscriber numbers to which the charging criteria determined for the group of special cells may be applied, a restricted subscriber group is defined. It is a list of subscriber numbers recorded into the service data point SDP of the service control point SCP. During call setup described above, SCP1 connected to the mobile switching centre MSC1/SSP1 of subscriber A finds out by means of a charging criterion analysis what is the relation of subscribers A and B to the restricted subscriber group, and what is the relation of the location cells of the subscribers to the group of special cells. An individual charging criterion may be determined for each combination. The number of combinations may be limited so that, for example, if both the subscriber number and the location cell of either of the subscribers or both of the subscribers belong to the restricted subscriber group and to the group of special cells, individual charging criteria will be applied. The numbers of the subscriber group may also be determined by means of the Private Numbering Plan PNP.

The cells belonging to the group of special cells may be distributed in the areas of several mobile services switching centres. A cell f in location area 22 of MSC2/SSP2 is determined to the group of special cells in addition to the above-mentioned cells a, c, d, and e, shown in FIG. 1. Every SCP has information on which cells belong to the group of special cells at least in the area of the MSC connected to it. Alternatively, each SCP may have information on all the cells located in the different MSC areas of the mobile telephone network and forming the group of special cells. Suppose subscriber A is located in cell a, and subscriber B is in cell f of MSC2/SSP2. In accordance with call setup described above, MSC1/SSP1 receives the information on the number and the location cell of subscriber A once the mobile station of the subscriber has sent a call setup message. SCP1 connected to MSC1/SSP1 checks whether the location cell a of subscriber A belongs to the group of special cells and detects this is the case. In accordance with call setup described above, MSC2/SSP2 receives the information on the location cell of subscriber B once the mobile station MS-B of subscriber B has replied to the paging message sent in its location area 22. In order that SCP1 could take into account upon determining the charging criterion whether the location cell f of subscriber B belongs to the group of special cells, SCP1 must have the information on the location cell of subscriber B before a call is connected between the subscribers. Thus, special charging criteria may be applied in real-time from the beginning of the call to internal calls of the group, as well as calls originating from and terminating in the group. For transmitting the information on the location cell, three different embodiments will be disclosed below.

The information to be transmitted from MSC2/SSP2 to the SCP1 connected to the MSC1/SSP1 of subscriber A, concerning the location cell of subscriber B may be just a piece of information on the location cell which has been found out after the mobile station MS-B of subscriber B has replied to the paging message sent within its location area. In such a case, SCP1 first analyses on the basis of the cell information received on whether the location cell of subscriber B belongs to the group of special cells, and thereafter determines the charging criterion.

Alternatively, the analysis for finding out whether the location cell of subscriber B belongs to the group of special cells or not may be carried out already in SCP2 connected to MSC2/SSP2. In that case, the information on the location cell to be transmitted to SCP1 is the result of said analysis, and SCP1 may immediately utilize the result received for determining the charging criterion.

The above description does not state any trigger criteria for triggering the use of a charging criteria service program provided by the intelligent network when the trigger criteria is fulfilled. There may be several trigger criteria. A trigger criteria may be e.g. the IN service class of a subscriber (i.e. the subscriber belongs to a special subscriber group, e.g. to the PNP group), or it is possible to start using the IN service in the connection of each call.

In a case where the calling or the called subscriber is a PBX subscriber, it is possible to determine the PBX subscriber a virtual cell to be used when it is necessary to take a PBX subscriber into account when determining the charging criteria. This virtual cell information, or information related to charging is of no importance to the radio system. Virtual cell information may also be applied to a PSTN subscriber. When it is a question of a PABX or a PSTN network, the virtual cell information may be stored in the mobile services switching centre to which these networks are connected.

Everything that has been said about the case where a group of special cells is located within the area of one MSC is also applicable as such to a case in which the cells of the special group are distributed in the areas of several MSC's. It is thus possible to form a restricted group of subscribers, to use a private number etc.

In the following, three different embodiments for transmitting the information on the location cell to the SCP connected to the MSC of subscriber A will be disclosed.

Figure 3:
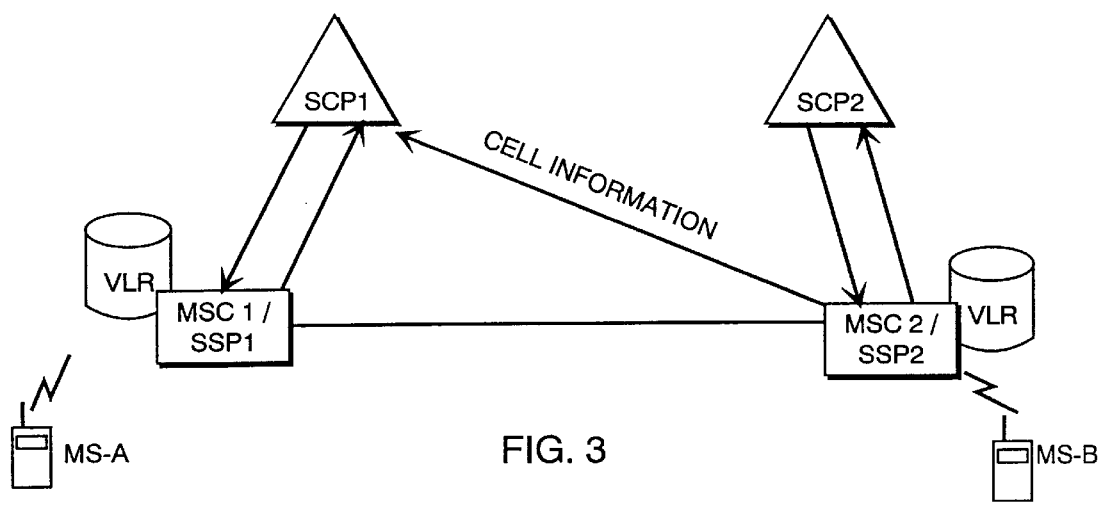
FIG. 3 shows a first embodiment of the invention.

FIG. 3, showing only the network components essential to the invention, illustrates a first embodiment, according to which the information on the location cell of subscriber B is transmitted to the SCP1 connected to the MSC1/SSP1 of subscriber A. The identifier of the service program determining the address of SCP1 and the charging criterion may be obtained by MSC2/SSP2 from MSC1/SSP1 e.g. as follows:

a) in a call setup message IAM in accordance with ISUP either in a field "Called Party Number", in a field "Generic Number", whereby the address and identifier information is inserted in these fields, or a new field or new fields are defined in the message for the address and identifier information, b) in a new ISUP (TUP) message intended for this purpose, transmitted from the MSC of subscriber A to the MSC of subscriber B, c) in a new pair of ISUP messages intended for this purpose, wherein the MSC of subscriber B (upon detecting that e.g. the cell of subscriber B belongs to the group of special cells) first sends the MSC of subscriber A an interrogation on whether the MSC of subscriber A needs this cell information. The MSC of subscriber A may response to the inquiry by sending the MSC of subscriber B the information on a service control point and a service program, whereby the new message will contain a SCP id and a Correlation Id.

By means of a call setup message, it is also possible to ask for the information on the location cell of subscriber B separately. This is an alternative for sending the information on the location cell every time. Once the mobile switching centre MSC2/SSP2 has found out in which cell the subscriber is located, it may ask the service control point SCP2 to analyse the cell information. This must be done it each service control point SCP has an information regarding only the special cells of the mobile switching centre connected to the SCP in question. The information on the location cell of subscriber B, either the cell information only, or the information on whether the cell possibly belongs to the group of special cells, obtained as a result of the analysis, is sent from MSC2/SSP2 to the SCP1 connected to MSC1/SSP1. The information on the location cell of subscriber B is sent, e.g., by means of an Assist Request Instruction procedure in accordance with an INAP protocol by inserting the information in a field "extensions" of the procedure, or by defining a separate message in the INAP for transmitting this information, in which message the information is also transmitted on the SCP in question (a so-called SCP id) and on the service program (a so-called Correlation id) related to it. Once MSC1/SSP1 has received an answer message sent by MSC2/SSP2, as is well known, in response to that subscriber B has answered the call, it will report it to its SCP1. The answer message will initiate charging of the call.

Figure 4:
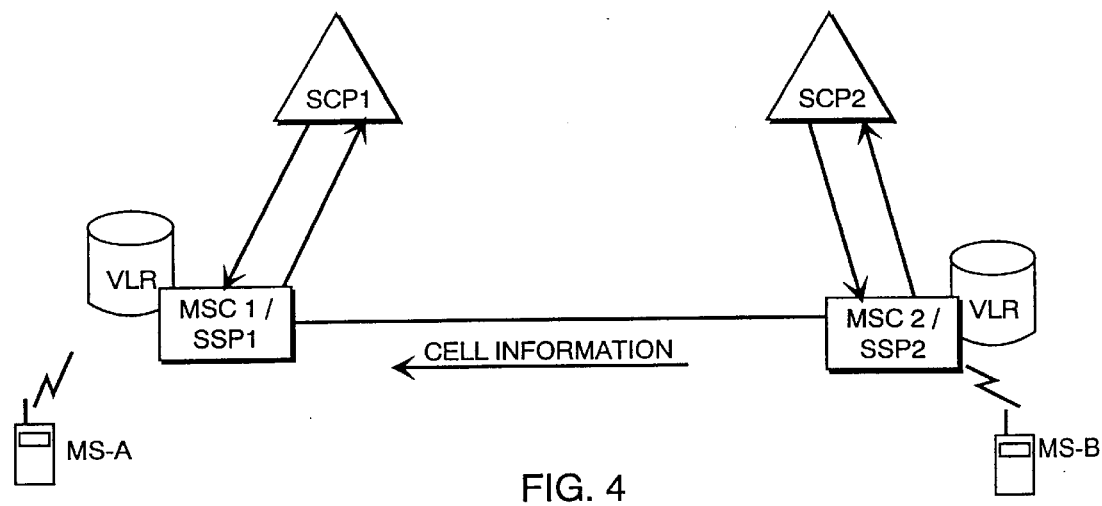
FIG. 4 shows a second embodiment of the invention.

FIG. 4 shows a solution in accordance with a second embodiment for transmitting information on the location cell of subscriber B. It differs from the solution of the first embodiment shown in FIG. 3 in that the information on the location cell of subscriber B is first transmitted to the MSC1/SSP1 of subscriber A, and further to SCP1. In this embodiment, it is not necessary to provide the address of SCP1 and the identifier of the service program determining the charging criterion in the call setup message, but it is possible to transmit an information on the location cell of subscriber B in the message provided that the information is not required every time. The information on the location cell of subscriber B is sent in a prior art message in accordance with signalling used between mobile switching centres, or a separate message may be created for it. The use of messages in accordance with signalling used between mobile switching centres for transmitting information on the location cell is disclosed in a parallel patent application FI 946091 filed simultaneously with the present application.

In accordance with the above-mentioned parallel patent application, the information on a location cell may be inserted e.g. in an Address Complete message, which is sent by the MSC of subscriber B to the MSC of subscriber A after a successful paging of the called subscriber. Alternatively, the information on the location cell may be added to the answer message, which is sent by the MSC of subscriber B to the MSC of subscriber A in response to that subscriber B has answered the call. The information on the location cell, added to the answer message, may also be used for confirming or canceling a previous information on the location cell, received in an Address Complete Message. In ISUP signalling, the Initial Address Message is IAM, Address Complete Message is ACM and Answer Message is ANM. In TUP signalling, the abbreviation for the answer message is ANU (Answer signal, unqualified), ANC (Answer signal, charge), or ANN (Answer signal, no charge). Depending on the application, other messages may alternatively also be used, such as Call Progress, Connect.

Once the information on the location cell is received in one of the above-mentioned messages, MSC1/SSP1 will report it to SCP1, which now has all the information for determining the charging criterion. Once MSC1/SSP1 has received the answer message, it will also report the message to SCP1, which will then determine the charging criterion.

Figure 5:
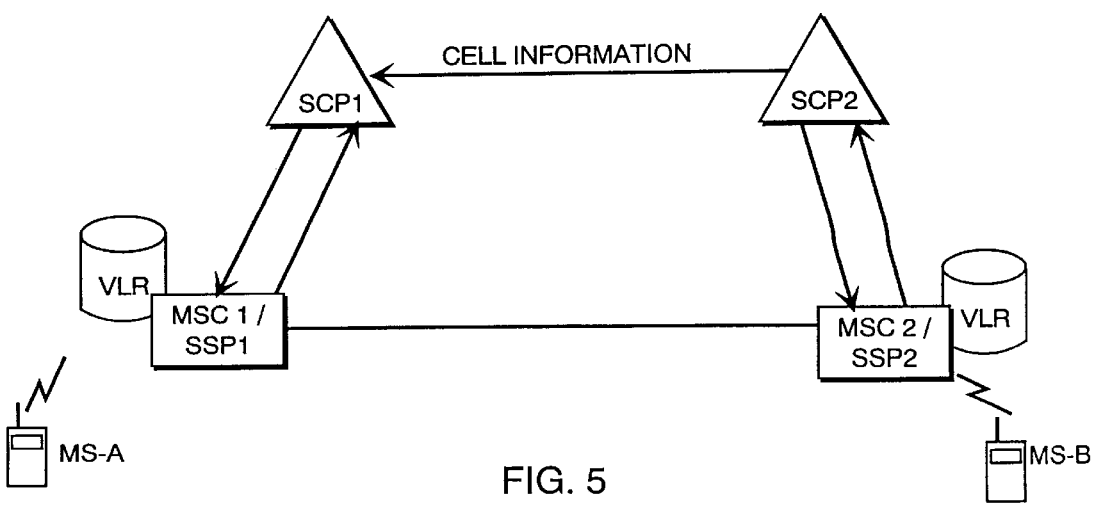
FIG. 5 shows a third embodiment of the invention.

FIG. 5 shows a third embodiment for transmitting the information on the location cell of subscriber B to SCP1. After MSC2/SSP2 has found out the location cell of subscriber B as described above, SCP2 reports the information on the location cell of subscriber B to the SCP1 connected to MSC1/SSP1. The information on the address has been obtained by SCP2 in the call setup message.

Once the MSC of subscriber A has obtained a normal answer message from the MSC of subscriber B, it will report it to SCP1, which will determine the charging criterion. The call will be charged on the basis of this charging criterion. This embodiment requires that there is a signalling connection between the SCP's. In an intelligent network conceptual model called CS1 (Capability Set 1) determined by CCITT, no signalling connection is defined between the SCP's, but in a model CS2 which is presently being developed, a signalling connection is under consideration. In the signalling connection, e.g. a MAP protocol or an INAP protocol could be employed by defining in them a new message for transmitting the information on the location cell.

Regardless of the method of transmitting information on the location cell, the information must arrive at the SCP connected to the MSC of subscriber A along with the answer message at the latest in order that charging would have sufficient time to utilize the information on the location cell of subscriber B.

When a PABX or a PSTN subscriber is participating in a call, the above-mentioned messages or other known signalling messages will be used for transmitting virtual cell information from the MSC of the called subscriber to the MSC of the calling subscriber. For this purpose it is also possible to create separate signalling messages if necessary.

With the method of the invention, it is possible to implement a "wireless office" system, where a group of cells is formed of cells including various geographically distant units of a community, company, etc.

The above explanation and the figures associated therewith are only intended to illustrate the present invention. Different variations and modifications of the invention will be obvious to a person skilled in the art without deviating from the scope and the spirit of the invention set forth in the attached claims.

What is claimed is:

1. A method for improving charging criteria in a cellular mobile telephone network wherein a service switching point SSP is connected to a mobile switching centre MSC for providing subscribers access to services of a service control point SCP, comprising forming a group of special cells comprising at least one cell of the cells of the mobile telephone network, forming a restricted subscriber group based on subscriber numbers, forming a charging criterion service at the service control point SCP, determining, at the service control point, based on cell information sent to the service control point from the service switching point during a call setup, whether a location cell of a subscriber participating in a call belongs to the group of special cells, determining at the service control point whether a subscriber number of a subscriber participating in the call belongs to the restricted subscriber group, and the service control point applying, according to the charging criterion service, a charging criterion determined for the group of cells to the call when at least one of the subscribers belongs to the group of cells or the subscriber number associated with the subscriber belongs to the restricted subscriber group.

2. A method as claimed in claim 1, wherein the information on the location cell of a called subscriber is transmitted in connecting the call.

3. A method as claimed in claim 1, wherein the information on the location cell of a called subscriber is transmitted in response to a request sent by the MSC of the calling subscriber in a call setup message during call setup.

4. A method as claimed in claim 1, wherein the information on the location cell of a called subscriber is inserted in a message sent by the mobile switching centre of the called subscriber once the called subscriber has responded to a paging message and wherein the information on the location cell is further forwarded from the mobile switching centre of the calling subscriber to a service control point connected thereto.

5. A method as claimed in claim 1, wherein the information on the location cell of a called subscriber is inserted in a message sent by the mobile switching centre of the called subscriber once the called subscriber has answered a call, and wherein the information on the location cell is further forwarded from the mobile switching centre of the calling subscriber to the service control point connected thereto.

6. A method as claimed in claim 1, wherein a new message is formed for transmitting information on the location cell from the mobile switching centre of a called subscriber to the mobile switching centre of the calling subscriber, and wherein the information on the location cell is further forwarded from the mobile switching centre of the calling subscriber to the service control point connected thereto.

7. A method as claimed in claim 1, wherein the information on the location cell of a called subscriber is transmitted from the mobile switching centre of the called subscriber to the service control point connected to the mobile switching centre of the calling subscriber.

8. A method as claimed in claim 1, wherein a message is transmitted containing the information on the location cell of a called subscriber from the service control point connected to the mobile switching centre of the called subscriber to the service control point connected to the mobile switching centre of the calling subscriber.

9. A method as claimed in claim 7, wherein the information on the service switching point connected to the mobile switching centre of the calling subscriber and a service program related thereto are added to a call control message sent by said mobile switching centre to the mobile switching centre of the called subscriber.

10. A method as claimed in claim 7, wherein the information on the service switching point connected to the mobile switching centre of the calling subscriber and a service program related thereto are inserted in a new message sent by said mobile switching centre to the mobile switching centre of the called subscriber.

11. A method as claimed in claim 7 or 8, wherein a new pair of messages are formed for transmitting the information on the service switching point connected to the mobile switching centre of the calling subscriber and a service program related thereto, in which a first message contains an interrogation sent by the mobile switching centre of the called subscriber to the mobile switching centre of the calling subscriber on whether the calling mobile switching centre requires the information on the location cell of the called subscriber, and a second message is sent by the mobile switching centre of the calling subscriber to the mobile switching centre of the called subscriber when the first message contains the information relating to the service control point and a related service program.

12. A method as claimed in claim 1, wherein the information on the location cell of a called subscriber describes a cell in which the called subscriber is located and the service control point connected to the mobile switching centre of the calling subscriber analyses whether said cell belongs to the group of cells.

13. A method as claimed in claim 12, wherein when the information on the location cell of the called subscriber provides a result of the analysis on whether the location cell of the called subscriber belongs to the group of cells, the service control point connected to the mobile switching centre of the called subscriber makes said analysis.

14. A method as claimed in claim 1, wherein the numbers in the restricted subscriber group are private numbers, and the private number of the called subscriber is converted into a subscriber number at the beginning of call setup.

15. A method as claimed in claim 12, wherein a PBX exchange or part of a PSTN/ISDN network is set as a virtual cell, and, when the subscriber number analysis of at least one of the subscribers proves that the subscriber is a subscriber of the PBX exchange or a part of said PSTN/ISDN network, the charging criterion is applied.

* * * * *